(12) United States Patent
Kaga et al.

(10) Patent No.: US 11,128,012 B2
(45) Date of Patent: Sep. 21, 2021

(54) BATTERY MODULE INCLUDING THERMAL INSULATOR DISPOSED BETWEEN BATTERY BLOCKS

(71) Applicant: Panasonic Intellectual Property Management Co., Ltd., Osaka (JP)

(72) Inventors: Yoshito Kaga, Osaka (JP); Takeshi Enomoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 80 days.

(21) Appl. No.: 16/307,260

(22) PCT Filed: Jun. 13, 2017

(86) PCT No.: PCT/JP2017/021717
§ 371 (c)(1),
(2) Date: Dec. 5, 2018

(87) PCT Pub. No.: WO2018/003478
PCT Pub. Date: Jan. 4, 2018

(65) Prior Publication Data
US 2019/0181399 A1  Jun. 13, 2019

(30) Foreign Application Priority Data

Jun. 29, 2016 (JP) .............................. JP2016-128698
Jun. 29, 2016 (JP) .............................. JP2016-128699

(51) Int. Cl.
*H01M 50/213* (2021.01)
*H01M 10/6563* (2014.01)
(Continued)

(52) U.S. Cl.
CPC ....... *H01M 50/213* (2021.01); *H01M 10/613* (2015.04); *H01M 10/643* (2015.04);
(Continued)

(58) Field of Classification Search
CPC .... H01M 2/105; H01M 2/1077; H01M 2/206; H01M 2/263; H01M 10/613;
(Continued)

(56) References Cited

U.S. PATENT DOCUMENTS

| | | | |
|---|---|---|---|
| 2004/0142238 A1* | 7/2004 | Asahina | B60L 58/19 429/176 |
| 2009/0141447 A1 | 6/2009 | Soma et al. | |
| 2010/0136404 A1* | 6/2010 | Hermann | H01M 10/6555 429/120 |

(Continued)

FOREIGN PATENT DOCUMENTS

| | | |
|---|---|---|
| CN | 101449419 A | 6/2009 |
| CN | 104220286 A | 12/2014 |

(Continued)

OTHER PUBLICATIONS

International Search Report of PCT application No. PCT/JP2017/021717 dated Aug. 1, 2017.

(Continued)

*Primary Examiner* — Sean P Cullen
(74) *Attorney, Agent, or Firm* — McDermott Will and Emery LLP

(57) ABSTRACT

A battery module includes a plurality of battery blocks arranged in an X direction and thermal insulating boards that are each disposed between the battery blocks adjacent to each other in the X direction. The thermal insulating boards have a thermal insulating property. Each battery block includes a plurality of cylindrical batteries closely arranged in two or more rows in a staggered formation, with central axes of the cylindrical batteries being parallel to each other, and a block case entirely surrounding a periphery of a battery unit made up of the plurality of the cylindrical batteries so that the plurality of cylindrical batteries stays closely arranged.

10 Claims, 10 Drawing Sheets

(51) Int. Cl.
  *H01M 10/6556* (2014.01)
  *H01M 10/643* (2014.01)
  *H01M 10/613* (2014.01)
  *H01M 10/653* (2014.01)
  *H01M 10/6557* (2014.01)
  *H01M 50/20* (2021.01)
  *H01M 50/502* (2021.01)
  *H01M 50/538* (2021.01)

(52) U.S. Cl.
  CPC ..... *H01M 10/653* (2015.04); *H01M 10/6556* (2015.04); *H01M 10/6557* (2015.04); *H01M 10/6563* (2015.04); *H01M 50/20* (2021.01); *H01M 50/502* (2021.01); *H01M 50/538* (2021.01)

(58) Field of Classification Search
  CPC ............. H01M 10/643; H01M 10/653; H01M 10/6556; H01M 10/6557; H01M 10/6563
  USPC .......................... 429/99, 120, 156, 158, 159
  See application file for complete search history.

(56) References Cited

U.S. PATENT DOCUMENTS

2014/0154545 A1* 6/2014 Kishii ................ H01M 10/643 429/99
2015/0249238 A1* 9/2015 Andre ....................... F28F 3/12 429/99
2016/0006007 A1 1/2016 Takasaki et al.
2016/0336556 A1* 11/2016 Okutani .............. H01M 10/486

FOREIGN PATENT DOCUMENTS

| | | | | |
|---|---|---|---|---|
| EP | 2793310 | | 10/2014 | |
| JP | 11329517 A | * | 11/1999 | |
| JP | 2012-033464 | | 2/2012 | |
| JP | 2013-077432 | | 4/2013 | |
| JP | 2013-161720 | | 8/2013 | |
| JP | 2014-237910 | | 12/2014 | |
| JP | 2014237910 A | * | 12/2014 | |
| JP | 2015-019026 | | 1/2015 | |
| WO | 2013/088702 | | 6/2013 | |
| WO | 2014/132649 | | 9/2014 | |
| WO | 2015/118597 | | 8/2015 | |
| WO | WO-2015118597 A1 | * | 8/2015 | .......... H01M 10/486 |
| WO | WO-2016136194 A1 | * | 9/2016 | .............. H01M 2/10 |

OTHER PUBLICATIONS

English Translation of Chinese Office Action dated Mar. 4, 2021 for the related Chinese Patent Application No. 201780039210.3.

* cited by examiner

BATTERY MODULE INCLUDING THERMAL INSULATOR DISPOSED BETWEEN BATTERY BLOCKS

CROSS-REFERENCE TO RELATED APPLICATIONS

This application is a U.S. national stage application of the PCT International Application No. PCT/JP2017/021717 filed on Jun. 13, 2017, which claims the benefit of foreign priority of Japanese patent applications 2016-128698 filed on Jun. 29, 2016 and 2016-128699 filed on Jun. 29, 2016, the contents all of which are incorporated herein by reference.

TECHNICAL FIELD

The present disclosure relates to a battery module.

BACKGROUND ART

A conventional battery module is disclosed in PTL 1. The battery module includes a plurality of cylindrical batteries and a battery case. The cylindrical batteries are accommodated in a plurality of respective cylindrical holes provided in the battery case. The battery case of the battery module prevents the cylindrical batteries from coming into contact with each other. This inhibits one cylindrical battery that has abnormally generated heat due to thermal runaway or other reasons from making an adverse impact on the other cylindrical batteries.

CITATION LIST

Patent Literature

PTL 1: International Patent Publication No. 2014/132649

SUMMARY OF THE INVENTION

In the battery module of PTL 1, an interval between the cylindrical batteries is widened. This leads to a decrease in density of the installed cylindrical batteries and a decrease in energy density of the battery module. On the other hand, removal of the battery case in order to avoid this problem may allow a cylindrical battery that has abnormally generated heat to affect a large number of the other cylindrical batteries.

It is an object of the present disclosure to provide a battery module that has high energy density while inhibiting temperature rise in a large number of cylindrical batteries.

A battery module according to the present disclosure includes a plurality of battery blocks arranged in one direction and a thermal insulator disposed between the battery blocks adjacent to each other in the one direction. The thermal insulator has a thermal insulating property. Each of the battery blocks includes a plurality of cylindrical batteries closely arranged in two or more rows in a staggered formation, with central axes of the cylindrical batteries being parallel to each other, and a block case entirely surrounding a periphery of a battery unit made up of the plurality of cylindrical batteries so that the plurality of cylindrical batteries stays closely arranged.

The battery module according to the present disclosure has high energy density while inhibiting temperature rise in a large number of the cylindrical batteries.

DESCRIPTION OF EMBODIMENTS

Exemplary embodiments of the present disclosure will now be described in detail with reference to the attached drawings. It is initially envisaged that a new exemplary embodiment can be made by suitably combining some distinctive elements in any of the exemplary embodiments and modifications thereof described hereafter.

In the exemplary embodiments described below, every battery block has a substantially rectangular parallelepiped shape, while an X direction regarded as one direction coincides with a width direction (a transverse direction) of the battery block, a Y direction orthogonal to both the one direction and a central axis direction (an extension direction) of each cylindrical battery coincides with a longitudinal direction of the battery block, and a Z direction regarded as the central axis direction of the cylindrical battery coincides with a height direction of the battery block. However, the one direction may coincide with a longitudinal direction of every battery block having a substantially rectangular parallelepiped shape, for example, other than the width direction of the battery block having a substantially rectangular parallelepiped shape. The battery block may not have a substantially rectangular parallelepiped shape. The battery block may have any shape such as the shape of a running track, an isosceles trapezoid, an ellipse, or a circle in planar view. Preferably, the battery block has a shape that can be divided into two equal parts by a vertical plane normal to the one direction, i.e. a direction in which a plurality of the battery blocks stands side by side.

Figure 1:
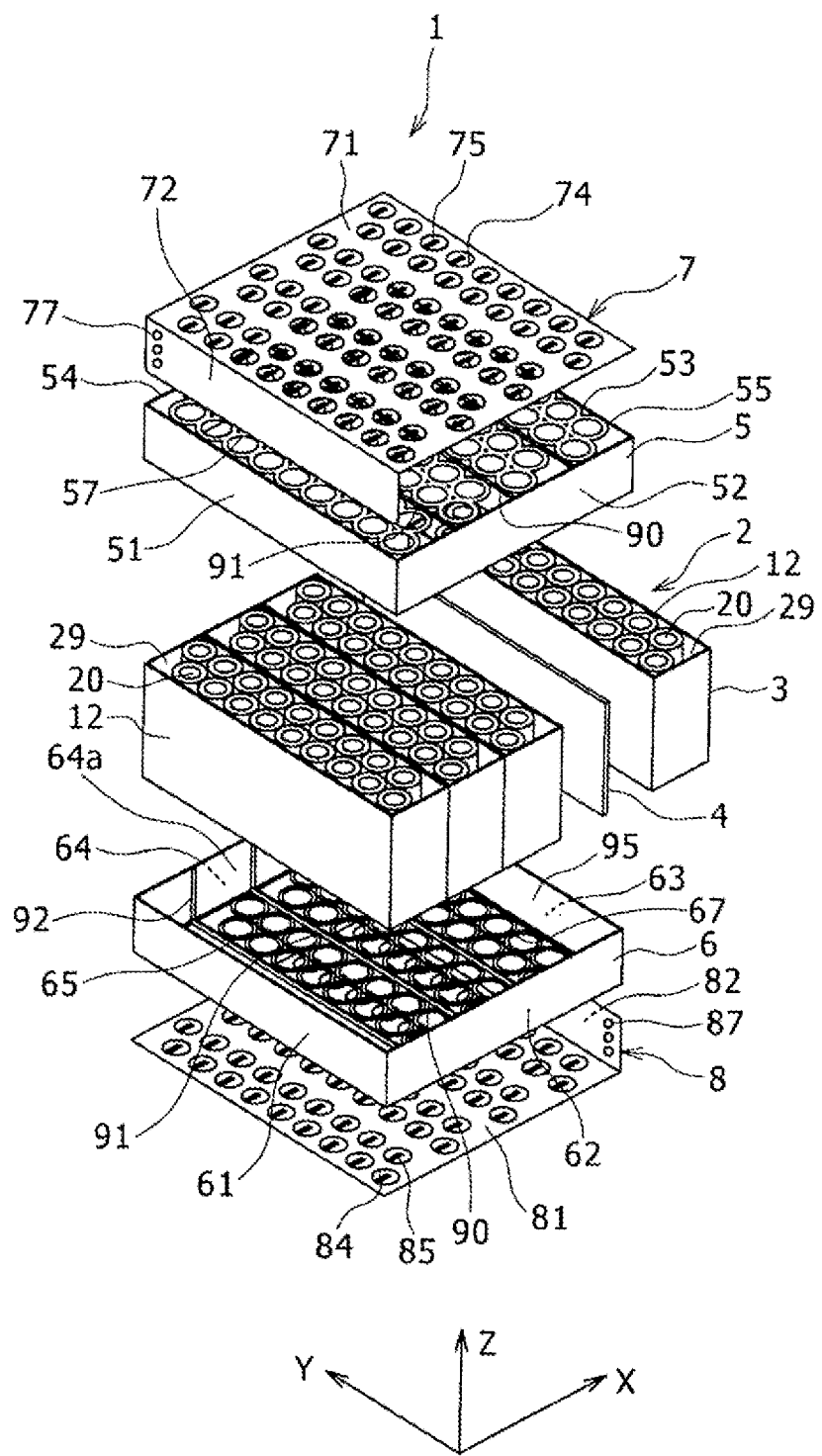
FIG. 1 is an exploded perspective view of a battery module according to an exemplary embodiment of the present disclosure.
Figure 2:
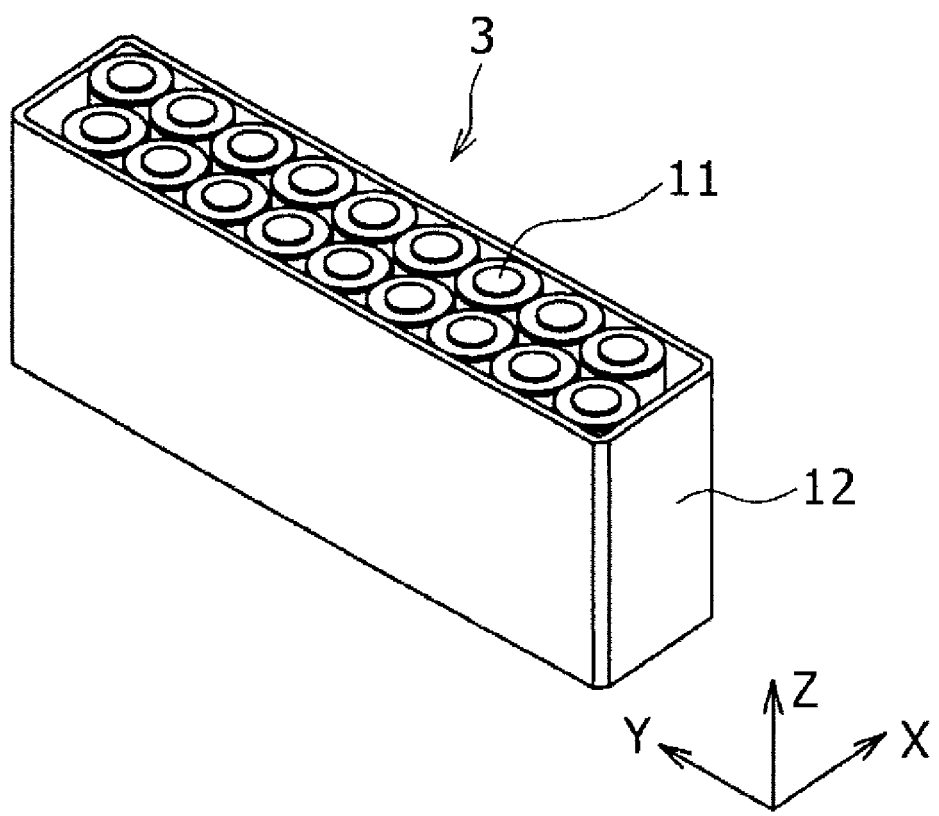
FIG. 2 is a perspective view of a battery block included in the battery module.
Figure 3:
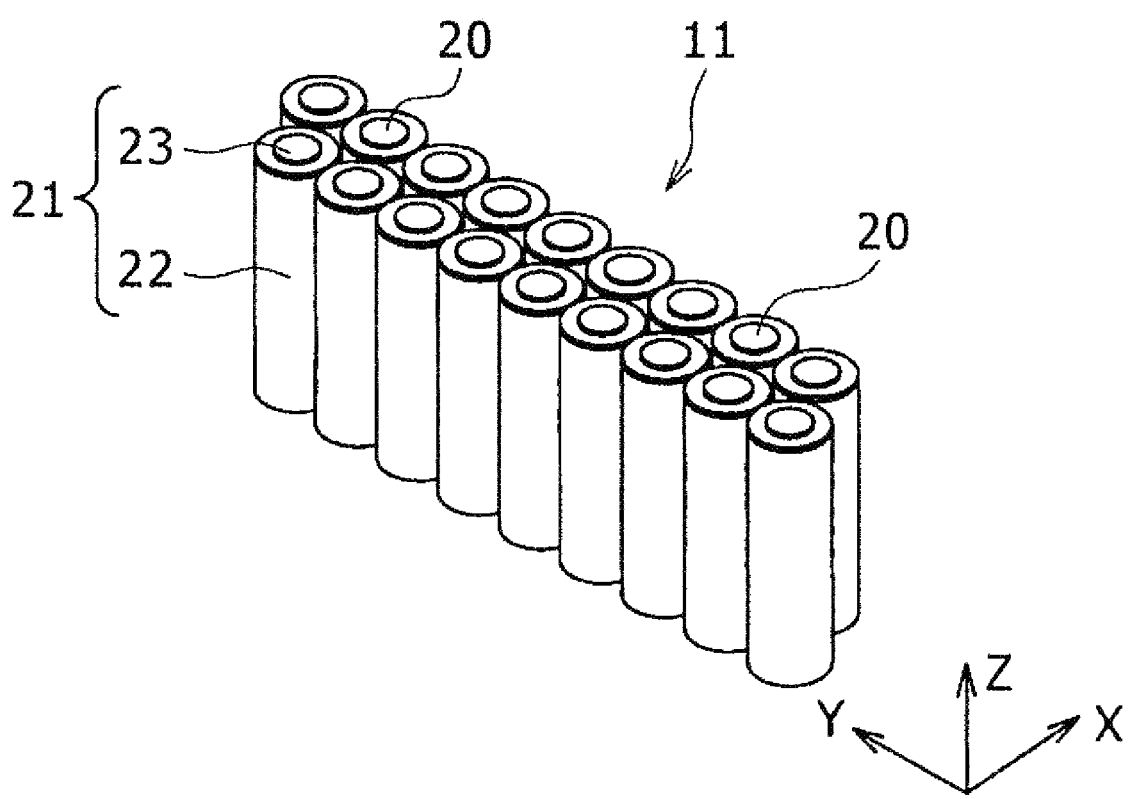
FIG. 3 is a perspective view of a battery unit of the battery block.
Figure 4:
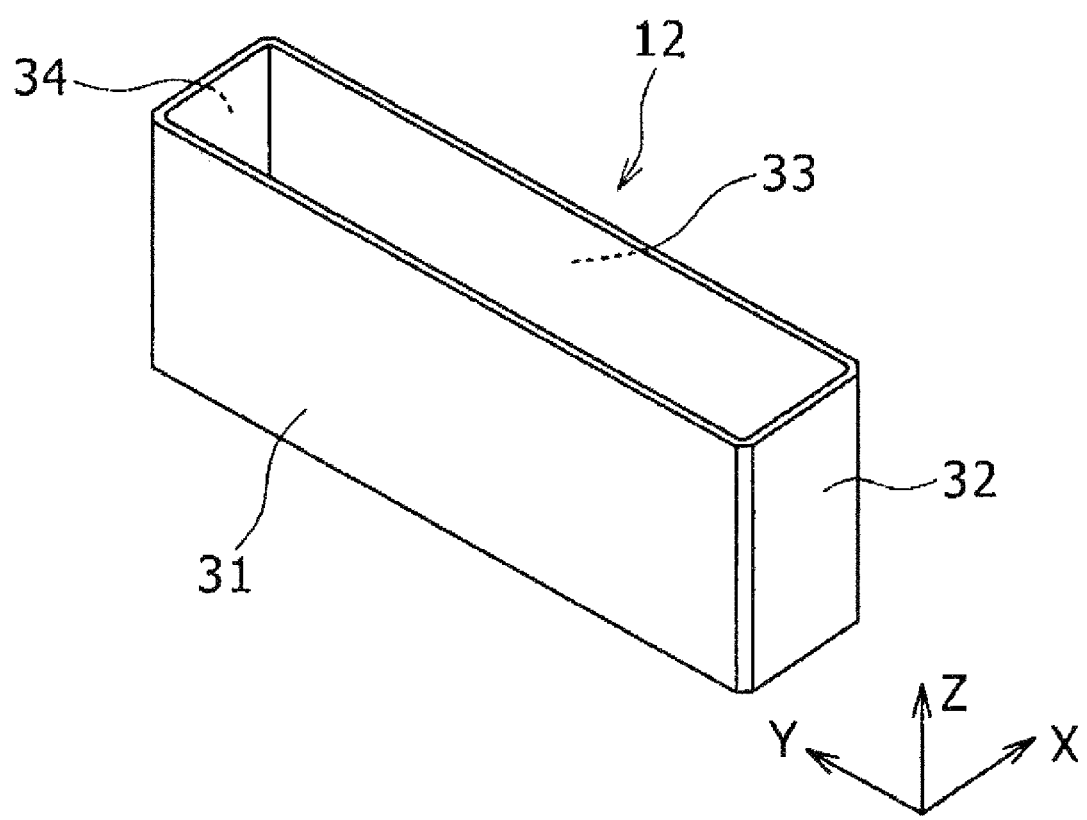
FIG. 4 is a perspective view of a block case of the battery block.

FIG. 1 is an exploded perspective view of battery module 1 according to an exemplary embodiment of the present disclosure. FIG. 2 is a perspective view of battery block 3. FIG. 3 is a perspective view of battery unit (battery assembly) 11 for battery block 3. FIG. 4 is a perspective view of block case 12 for battery block 3.

As illustrated in FIG. 1, battery module 1 includes battery block unit (battery block assembly) 2, a plurality of thermal insulating boards 4, first lid part 5, second lid part 6, positive-electrode current collector plate 7, and negative-electrode current collector plate 8. Battery block unit 2 includes a plurality of battery blocks 3. Thermal insulating board 4 is an example of a thermal insulator having a thermal insulating property.

As illustrated in FIG. 2, battery block 3 includes battery unit 11 and block case 12. As illustrated in FIG. 3, battery unit 11 includes 18 cylindrical batteries 20 that are closely stacked in the X direction in two rows in a staggered arrangement (zigzag pattern), with each row being made up of nine cylindrical batteries 20. These 18 cylindrical batteries 20 extend in the Z direction, with their central axes being parallel to one another. The plurality of cylindrical batteries 20 included in battery unit 11 is disposed such that positive electrode terminals of all the batteries face one side of the Z direction.

The central axes of cylindrical batteries 20 in one of the rows deviate from the central axes of cylindrical batteries 20 in the adjacent row by a half pitch (a radius of the cylindrical battery) in the Y direction, so that cylindrical batteries 20 in the adjacent row partly get into gaps between cylindrical batteries 20 in the one row. As a result, distance between the central axes of cylindrical batteries 20 in the one row and the adjacent row in the X direction is smaller than a diameter of cylindrical battery 20 (43 times the radius).

The plurality of cylindrical batteries included in the battery unit may be closely arranged in three or more rows in a staggered formation. A number of batteries forming each row may be any integer greater than or equal to 1. Numbers of batteries forming respective rows may be identical across the rows or differ in two or more of the rows. The number of cylindrical batteries forming a battery unit may be any integer greater than or equal to 3. Preferably, the battery unit includes five or more cylindrical batteries. More preferably, the battery unit includes ten or more cylindrical batteries.

Unlike an example configuration shown in FIG. 3, the plurality of cylindrical batteries forming the battery unit may include a cylindrical battery whose positive electrode terminal faces the one side of the Z direction and a cylindrical battery whose positive electrode terminal faces the other side of the Z direction. In this case, cylindrical batteries adjacent to each other may be disposed in opposing directions such that a positive electrode terminal of one of the cylindrical batteries is near a negative electrode terminal of the other cylindrical battery, for example. The positive electrode terminal of one of the cylindrical batteries may be electrically connected to the negative electrode terminal of the other cylindrical battery via a lead wire or a similar conductor so that the plurality of cylindrical batteries included in one battery block (a battery unit) is connected in series.

With reference to FIG. 3, cylindrical battery 20, for example, includes battery case 21 made from iron or other metal and a power generation element accommodated in battery case 21. The power generation element includes, for example, an electrode assembly with a winding structure and a non-aqueous electrolyte. Battery case 21 is made up of case main body 22 formed in a bottomed cylindrical shape for the purpose of accommodating a power generation element and sealing body 23 sealing an opening of case main body 22. A gasket (not shown) is disposed between case main body 22 and sealing body 23. For example, sealing body 23 has a layered structure including a valve and a cap. An outer lateral peripheral surface of case main body 22 is covered with an insulating resin film, so that adjacent cylindrical batteries 20 are insulated from each other. Sealing body 23 functions as the positive electrode terminal of cylindrical battery 20, whereas an undersurface of case main body 22 functions as the negative electrode terminal of cylindrical battery 20. In this exemplary embodiment, cylindrical battery 20 is supposedly a lithium ion secondary battery.

As illustrated in FIG. 4, block case 12 has a rectangular frame shape in planar view and includes four rectangular flat-shaped lateral walls 31, 32, 33, and 34 to define a rectangular parallelepiped interior space. Block case 12 has openings at its one end and other end in the Z direction. A height of block case 12 is substantially equivalent to a height of a part of cylindrical battery 20 that excludes the positive electrode terminal (sealing body 23). Block case 12 is made of a metallic material such as aluminum, or a resin material, for example. Preferably, block case 12 is made of a thermosetting resin containing a filler. More preferably, block case 12 is made of a material having an insulating property. However, block case 12 may be made of any material. Battery block 3 (see FIG. 2) is assembled by accommodating battery unit 11 in the rectangular parallelepiped interior space of block case 12 such that a periphery of battery unit 11 is entirely surrounded with block case 12.

With reference to FIGS. 3 and 4, the rectangular parallelepiped interior space defined by block case 12 is equal to or slightly greater than battery unit 11 in length in the X direction and in length in the Y direction. As a result, if the plurality of cylindrical batteries 20 is accommodated in the interior space of block case 12, the plurality of cylindrical batteries 20 is maintained in a state in which the batteries are closely arranged in a staggered formation without freedom of movement.

With reference again to FIG. 1, first lid part 5 is a rectangular tubular lid part having an opening at its second end (a lower end in FIG. 1) in the Z direction and being made of a material with an insulating property. First lid part 5 includes four flat-shaped lateral walls 51, 52, 53, and 54 and one upper flat board 55 to define a rectangular parallelepiped recess that corresponds with a first part of battery block unit 2 (an upper part in FIG. 1) in the Z direction Second lid part 6 is a lid part having an opening at its first end in the Z direction and being made of a material with an insulating property Second lid part 6 includes four flat-shaped lateral walls 61, 62, 63, and 64 and one lower flat board 65 to define rectangular parallelepiped recess 95 that corresponds with a second part of battery block unit 2 in the Z direction.

A plurality of cross-sectionally rectangular (slender rectangular parallelepiped) ribs 90 is disposed on a reverse surface of first and second lid parts 5, 6 (a surface facing cylindrical batteries 20) at regular intervals in the X direction. Each rib 90 is made up of first rib parts 91, second rib part 92, and a third rib part (not shown). First rib parts 91 are disposed on inner end faces of the lid parts in the Z direction (faces of upper flat board 55 and the lower flat board adjacent to cylindrical batteries 20) so as to extend from first edges to second edges of the inner end faces along the Y direction. Second rib part 92 is disposed on a first inner end face in the Y direction (a face of lateral walls 54, 64 adjacent to cylindrical batteries 20) so as to extend from a first edge to a second edge of the inner end face along the Z direction. The third rib part is disposed on a second inner end face in the Y direction (a face of lateral walls 52, 62 adjacent to cylindrical batteries 20) so as to extend from a first edge to a second edge of the inner end face 64a along the Z direction. Second rib part 92 is joined to first rib parts 91 at the first edges of the inner end faces in the Y direction, while the third rib part is joined to first rib parts 91 at the second edges of the inner end faces in the Y direction. First, second, and third rib parts 91, 92 integrate and constitute rib 90.

For first and second lid parts 5, 6, a length from a first inner end face in the X direction to rib 90 adjacent to the first inner end face in the X direction, a length from a second inner end face in the X direction to rib 90 adjacent to the second inner end face in the X direction, and a length between adjacent ribs 90 in the X direction are each equal to or slightly greater than a length of battery block 3 in the X direction. For first and second lid parts 5, 6, a Y-direction length of recesses 95 provided on a reverse side is equal to or slightly greater than a length of battery block 3 in the Y direction. Thus, battery blocks 3 are supported by ribs 90 and accommodated in recesses 95 of first and second lid parts 5, 6.

Upper flat board 55 of first lid part 5 includes a plurality of positive-electrode cylindrical holes 57 provided to expose sealing bodies 23 (positive electrode terminals, see FIG. 3) of cylindrical batteries 20. Positive-electrode cylindrical hole 57 is a through-hole, an inside diameter of which is larger than a diameter of sealing body 23 of cylindrical battery 20 and smaller than a diameter of the cylindrical battery. Meanwhile, second lid part 6 includes a plurality of negative-electrode cylindrical holes 67 provided at its end surface in the Z direction to cover a portion of undersurfaces of cylindrical batteries 20 other than central parts of these undersurfaces in the Z direction. An inside diameter of negative-electrode cylindrical hole 67 is smaller than a diameter of the circular undersurface of cylindrical battery 20.

Battery blocks 3 are inserted one by one between the first inner end face of first lid part 5 in the X direction and rib 90 adjacent to the first inner end face, between the second inner end face of first lid part 5 in the X direction and rib 90 adjacent to the second inner end face, and between adjacent ribs 90 on first lid part 5 in the X direction such that a first part of battery blocks 3 in the Z direction is covered with first lid part 5. Battery blocks 3 are inserted one by one between the first inner end face of second lid part 6 in the X direction and rib 90 adjacent to the first inner end face, between the second inner end face of second lid part 6 in the X direction and rib 90 adjacent to the second inner end face, and between adjacent ribs 90 on second lid part 6 in the X direction such that a second part of battery blocks 3 in the Z direction is covered with second lid part 6. Battery blocks 3 adjacent to each other in the X direction are obstructed by rib 90 and separated by rib 90 in the X direction.

Thermal insulating board 4 is a flat board made of a material having a thermal insulating property. Preferably, thermal insulating board 4 is made of a material having a thermal conductivity lower than 0.50 W/(m° C.). More preferably, thermal insulating board 4 is made of a material having a thermal conductivity lower than 0.16 W/(m° C.). Further preferably, the material has a thermal conductivity lower than 0.10 W/(m° C.). More preferably, thermal insulating board 4 is made of a material having satisfactory thermal resistance in addition to thermal insulation. For example, it is preferable that thermal insulating board 4 has a normal heat resistant temperature of 90° C. or greater. More preferably, the normal heat resistant temperature is 110° C. or greater. Further preferably, thermal insulating board 4 has a normal heat resistant temperature of 130° C. or greater. Most preferably, the normal heat resistant temperature is 500° C. or greater. Further preferably, thermal insulating board 4 has an insulating property.

Thermal insulating board 4 may be suitably made of a fibrous heat insulating material such as glass wool or polyester, or may be suitably made of an expandable heat insulating material such as urethane foam. Preferably, thermal insulating board 4 is made of a fiber sheet material having cavities into which silica aerogel, a nanoporous substance with high thermal insulation, is implanted.

A front side and a back side of thermal insulating board 4 each have a rectangular shape. A thickness of thermal insulating board 4 is less than or equal to a width of rib 90. Preferably, a length of thermal insulating board 4 in a width direction (in the Z direction) is equal to or slightly shorter than the height of block case 12 (see FIG. 4) from which twice a height of rib 90 is subtracted. Preferably, a length of thermal insulating board 4 in a longitudinal direction (in the Y direction) is equal to or slightly shorter than a Y-direction length of block case 12 from which twice the height of rib 90 is subtracted.

A first part of thermal insulating board 4 in the Z direction is disposed in first lid part 5, whereas a second part of thermal insulating board 4 in the Z direction is disposed in second lid part 6. Thermal insulating board 4 overlaps second and third rib parts 92 on first and second lid parts 5, 6 when viewed along the Y direction. Thermal insulating board 4 overlaps first rib parts 91 on first and second lid parts 5, 6 when viewed along the Z direction. In other words, thermal insulating board 4 is disposed between battery blocks 3 adjacent to each other in the X direction so as to interrupt between adjacent battery blocks 3 in the X direction.

Rib 90 described above includes first rib parts 91 extending along the Y direction and second and third rib parts 92 extending along the Z direction. However, the rib may include only the parts extending along the Y direction or only the parts extending along the Z direction. The rib parts may not necessarily extend from the first edges through the second edges of the end faces in the Y or Z directions. Alternatively, the rib parts may partly exist between the edges of the end faces in the Y or Z directions. In the description above, ribs 90 are disposed on first and second lid parts 5, 6. The ribs may be disposed on only any one of the first and the second lid parts. Alternatively, no ribs may be disposed in the battery module. For example, two battery blocks 3 adjacent to each other in the X direction may clamp thermal insulating board 4 therebetween so that the adjacent batteries are separated by thermal insulating board 4 in the X direction.

The plurality of battery blocks 3 and the plurality of thermal insulating boards 4 are accommodated in an internal chamber defined by first and second lid parts 5, 6 together. While the plurality of battery blocks 3 and the plurality of thermal insulating boards 4 are accommodated in the above-described internal chamber, positive-electrode cylindrical holes 57 of first lid part 5 expose sealing bodies (positive electrode terminals) 23 of cylindrical batteries 20, and the central parts of undersurfaces (negative electrode terminals) of cylindrical batteries 20 overlap negative-electrode cylindrical holes 67 in the Z direction. Since first lid part 5 is made of a material having an insulating property, sealing bodies (positive electrode terminals) 23 of different cylindrical batteries 20 are insulated from each other. Since second lid part 6 is made of a material having an insulating property, the negative electrode terminals of cylindrical batteries 20 are as well insulated from each other.

Positions of the plurality of battery blocks 3 in the Z direction are aligned with each other by first lid part 5. A sum of a depth of the recess of first lid part 5 and a depth of recess 95 of second lid part 6 is substantially equal to the height of block case 12. As a result, block cases 12 accommodated in the chamber as described above are substantially completely covered with first and second lid parts 5, 6 and hence these block cases are invisible from outside.

The block cases may not be substantially completely covered with the first and second lid parts and these block cases may be visible from outside. In contrast to the present exemplary embodiment, a lateral wall formed by the first and second lid parts together may have at least one through-hole. The battery blocks may be cooled by air that reaches the battery blocks from outside through the through-hole. The first and second lid parts may be omitted, with proviso that the positive and negative electrode terminals of the cylindrical batteries in the battery block unit are insulated from each other by a part other than the first and second lid parts. In this case, the battery blocks may be provided with at least one of a first end face and a second end face designed for the battery blocks in the Z direction, i.e. at least one of an end face facing in the Z direction and having a plurality of cylindrical holes to expose sealing bodies (positive electrode terminals) 23 of cylindrical batteries 20 and an end face facing in the Z direction and having a plurality of cylindrical holes to make only the central parts of undersurfaces of cylindrical batteries 20 visible in the Z direction. Thermal insulating board 4 described above is disposed between battery blocks 3 adjacent to each other in the X direction. However, a thermal insulator having a thermal insulating property and having a shape other than flat board forms may be disposed between battery blocks adjacent to each other in a direction.

Positive-electrode current collector plate 7, which is made of a conductive material such as a metallic material, includes flat board 71 having a rectangular front surface to substantially correspond with upper flat board 55 of first lid part 5 and lateral wall 72 extending from an end of flat board 71 in the Z direction orthogonal to flat board 71. Flat board 71 has a plurality of cylindrical holes 74 and positive-electrode connection strips 75 that project into respective cylindrical holes 74. Positive-electrode current collector plate 7 is disposed on a first side of first lid part 5 in the Z direction such that positive-electrode connection strips 75 are electrically connected to heads of sealing bodies (positive electrode terminals) 23 that are exposed through positive-electrode cylindrical holes 57 of first lid part 5.

Negative-electrode current collector plate 8, which is made of a conductive material such as a metallic material, includes flat board 81 having a rectangular front surface to substantially correspond with lower flat board 65 of second lid part 6 and lateral wall 82 extending from an end of flat board 81 in a direction orthogonal to flat board 81. Flat board 81 has a plurality of cylindrical holes 84 and negative-electrode connection strips 85 that project into respective cylindrical holes 84. Negative-electrode connection strips 85 extend toward recess 95 of second lid part 6 by bending toward the one side of the Z direction and passing through negative-electrode cylindrical holes 67. Negative-electrode current collector plate 8 is disposed on a second side of second lid part 6 in the Z direction such that negative-electrode connection strips 85 are electrically connected to the central parts of the undersurfaces of cylindrical batteries 20, which overlap negative-electrode cylindrical holes 67 of second lid part 6 in the Z direction.

In other words, positive-electrode current collector plate 7 is electrically connected to sealing bodies (positive electrode terminals) 23 of cylindrical batteries 20 by positive-electrode connection strips 75, whereas negative-electrode current collector plate 8 is electrically connected to the negative electrode terminals of cylindrical batteries 20 by negative-electrode connection strips 85. In this exemplary embodiment, all cylindrical batteries 20 included in battery block unit 2 are connected in parallel with positive- and negative-electrode current collector plates 7, 8.

In this exemplary embodiment, whole battery block unit 2 is provided with only one piece each of positive- and negative-electrode current collector plates 7, 8. Instead, these components may be configured in any other form. Every battery block 3 may be provided with one piece each of positive- and negative-electrode current collector plates 7, 8. Every batch of a predetermined number of battery blocks 3 may be provided with pluralities of respective positive- and negative-electrode current collector plates 7, 8.

Lateral wall 72 of positive-electrode current collector plate 7 has screw holes 77 at its first side in the Y direction. In the X direction, screw holes 77 overlap gap 29 in block case 12 that is disposed at one end in the X direction. When the plurality of cylindrical batteries 20 is arranged in block case 12 in a staggered formation, gap 29 is created near a corner in block case 12. Similarly, lateral wall 82 of negative-electrode current collector plate 8 has screw holes 87 at its second side in the Y direction. In the X direction, screw holes 87 overlap gap 29 in block case 12 that is disposed at the other end in the X direction. When the plurality of cylindrical batteries 20 is arranged in block case 12 in a staggered formation, gap 29 is created near a corner in block case 12.

Figure 5:
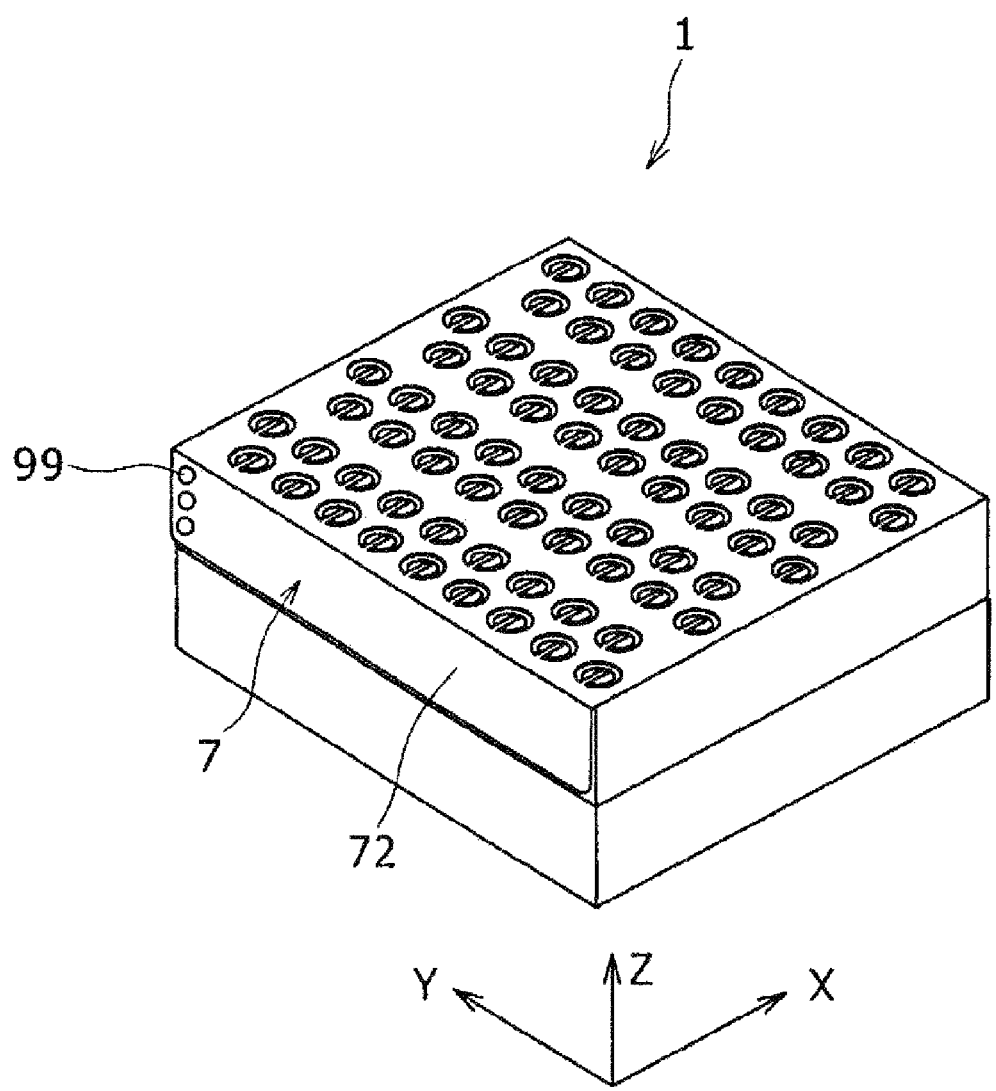
FIG. 5 is a perspective view of the battery module.

Lateral wall 72 of positive-electrode current collector plate 7 is fastened to both the lateral wall of first lid part 5 and block case 12 at the one end in the X direction with screws 99 (see FIG. 5) such that heads of shafts of screws 99 project into gap 29. Lateral wall 82 of negative-electrode current collector plate 8 is fastened to both the lateral wall of second lid part 6 and block case 12 at the other end in the X direction with screws (not shown). Because of positive- and negative-electrode current collector plates 7, 8 fastened in this manner, the plurality of battery blocks 3 and components 4 to 8 are integrated together, and battery module 1 is hence assembled as illustrated in the perspective view of FIG. 5. Battery module 1 may be used alone. Alternatively, a plurality of battery modules 1 may be connected in series or in parallel using bus bars.

According to the exemplary embodiment described above, the plurality of cylindrical batteries 20 in battery block 3 is closely arranged in two or more rows in a staggered formation. Thus, every gap created between the plurality of cylindrical batteries 20 is small, and the density of the plurality of cylindrical batteries 20 disposed in each battery block 3 is high. This configuration enables battery module 1 to include cylindrical batteries 20 having high energy density. Temperature of cylindrical batteries 20 in each battery block 3 is uniformed by battery cases 21 and block case 12. Block case 12 made of a metal is more effective than block case 12 made of a resin in making temperature of cylindrical batteries 20 uniform.

The plurality of cylindrical batteries 20 included in battery module 1 are distributed among the plurality of battery blocks 3. Thermal insulating board 4 having a thermal insulating property is disposed between adjacent battery blocks 3. As a result, even if cylindrical battery 20 included in one battery block 3 generates heat due to an abnormality and reaches a high temperature, heat from abnormal cylindrical battery 20 is hard to pass through thermal insulating board 4. This configuration hinders influence of the heat generation from extending to cylindrical batteries 20 in other battery blocks 3 and confines the influence to cylindrical batteries 20 within battery block 3 accommodating cylindrical battery 20 with which the abnormality has occurred. This averts an increase in temperature of the plurality of cylindrical batteries 20 inside battery block 3 adjacent to battery block 3 in which the abnormality has occurred and thereby inhibits an adverse impact that is otherwise created by an increase in the temperature.

Preferably, thermal insulating board 4 is a component that is selected because of having a normal heat resistant temperature greater than or equal to a maximum temperature of heat generated in battery block 3. Block case 12 is supposed to reach the maximum temperature in response to thermal runaway that has occurred to all cylindrical batteries 20 accommodated in the block case of battery block 3 if thermal runaway is produced by putting a nail into cylindrical battery 20 accommodated in same battery block 3 by experiment or testing. Thermal insulating board 4 having such a normal heat resistant temperature provides thermal insulation performance as expected and thus can insulate heat transmitted to block case 12 of abnormal battery block 3.

Heat transmitted to block case 12 of battery block 3 (an abnormal battery block) having cylindrical battery 20 that has entered thermal runaway decreases by thermal insulating board 4 before reaching a battery block adjacent to the abnormal battery block. The heat is then absorbed and dispersed by block case 12 and battery cases 21 of adjacent battery block 3 and is transmitted to cylindrical batteries 20 in adjacent battery block 3. Thus, heat to be transmitted to adjacent battery block 3 can be decreased to a level lower than a temperature at which thermal runaway propagates to cylindrical batteries 20 to prevent thermal runaway present at cylindrical battery 20 in abnormal battery block 3 from propagating to cylindrical batteries 20 in adjacent battery block 3. In particular, due to heat radiation by block case 12 of adjacent battery block 3, block case 12 made of a metallic material is helpful in lowering heat to a temperature at which cylindrical batteries 20 in adjacent battery block 3 do not enter thermal runaway. Block case 12 made of a resin material that contains an endothermic filler having an endothermic property lowers heat generated in block case 12 and is thus helpful in lowering heat to a temperature at which cylindrical batteries 20 in adjacent battery block 3 do not enter thermal runaway. If block case 12 is formed of a resin material, the resin material is preferably a thermosetting resin. A thermosetting resin forming block case 12 prevents block case 12 of abnormal battery block 3 from being melted, resulting in no resin melting. This prevents block case 12 of abnormal battery block 3 and block case 12 of adjacent battery block 3 from being put into contact with and thermally coupled to each other. This in turn removes a factor responsible for impairing thermal insulation performance.

Preferably, the thermosetting resin forming block case 12 is a resin having such a cross-linked structure as not to melt when being exposed to temperatures of 600° C. or higher and getting carbonized without melting to maintain shape of block case 12 when being exposed to high temperatures ranging from, for example, 800° C. to 1,000° C. Specific examples of such a thermosetting resin include unsaturated polyester, epoxy resins, melamine resins, and phenol resins.

The present exemplary embodiment embraces an unconventional technical idea, that is a technical idea under which a rise in temperature of the plurality of cylindrical batteries 20 contained in one battery block 3 is permitted on condition that the plurality of cylindrical batteries 20 included in battery module 1 are distributed among the plurality of battery blocks 3. This configuration enables the battery module to simultaneously achieve two mutually incompatible effects, i.e. the effect of high energy density and the effect of increased safety while inhibiting temperature rise in a large number of cylindrical batteries 20.

Further, various modifications or alterations may be made to the exemplary embodiments within the scope of the present disclosure as defined by the appended claims or their equivalents.

For example, in the exemplary embodiment described above, first and second lid parts 5, 6 have ribs 90 that are each designed to separate battery blocks 3 from each other in the X direction. However, as in the following description, a plurality of block cases 12, 112 incorporated in a battery block unit may include ribbed block case 112 provided with ribs 190 projecting from a first end of the block case in the X direction (a direction), in which ribs 190 are in contact with block case 12 or ribbed block case 112 adjacent to the first end of ribbed block case 112 in the X direction.

Figure 6:
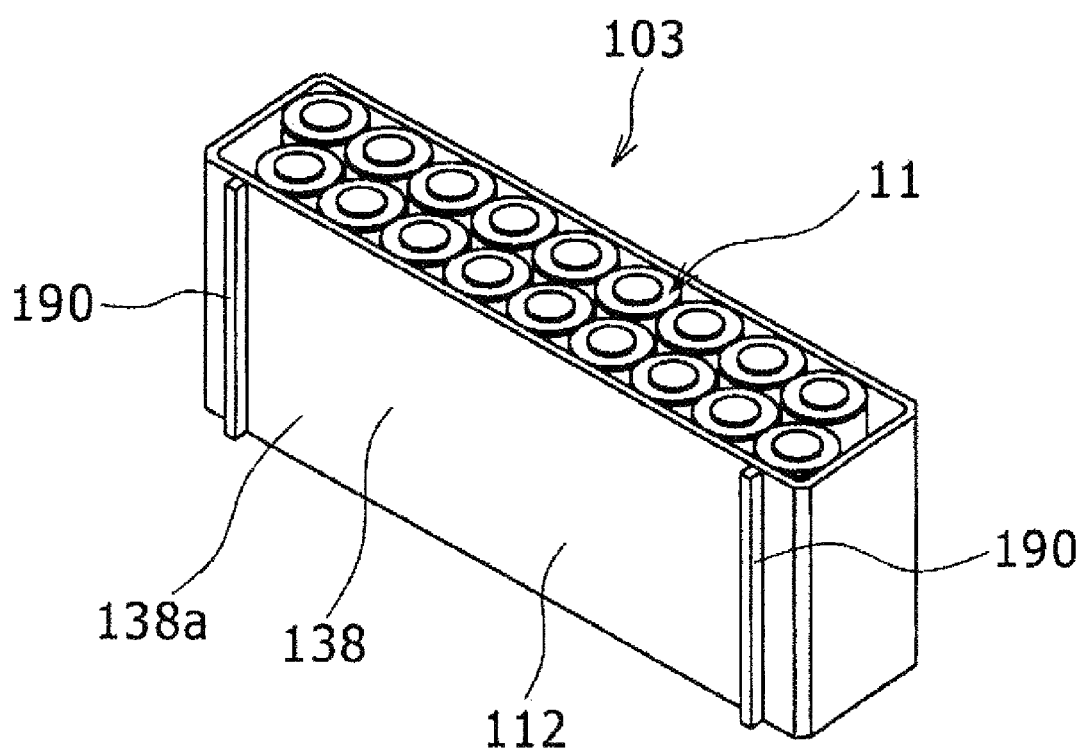
FIG. 6 is a perspective view of a battery block including a ribbed block case according to a modification of the exemplary embodiment.
Figure 6:
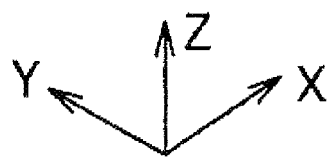

Specifically, as illustrated in FIG. 6, i.e. a perspective view of a modified example of battery block 103 that includes ribbed block case 112, ribbed block case 112 may include case main body 138 having a rectangular frame shape in planar view and a plurality of ribs 190 projecting from case main body 138 toward one side of the X direction and extending along the Z direction. Preferably, as illustrated in FIG. 6, a number of ribs 190 is two, and one of ribs 190 projects from a Y direction-wise first end of first end face 138a of case main body 138 in the X direction, whereas the other of ribs 190 projects from a Y direction-wise second end of first end face 138a.

Figure 7:
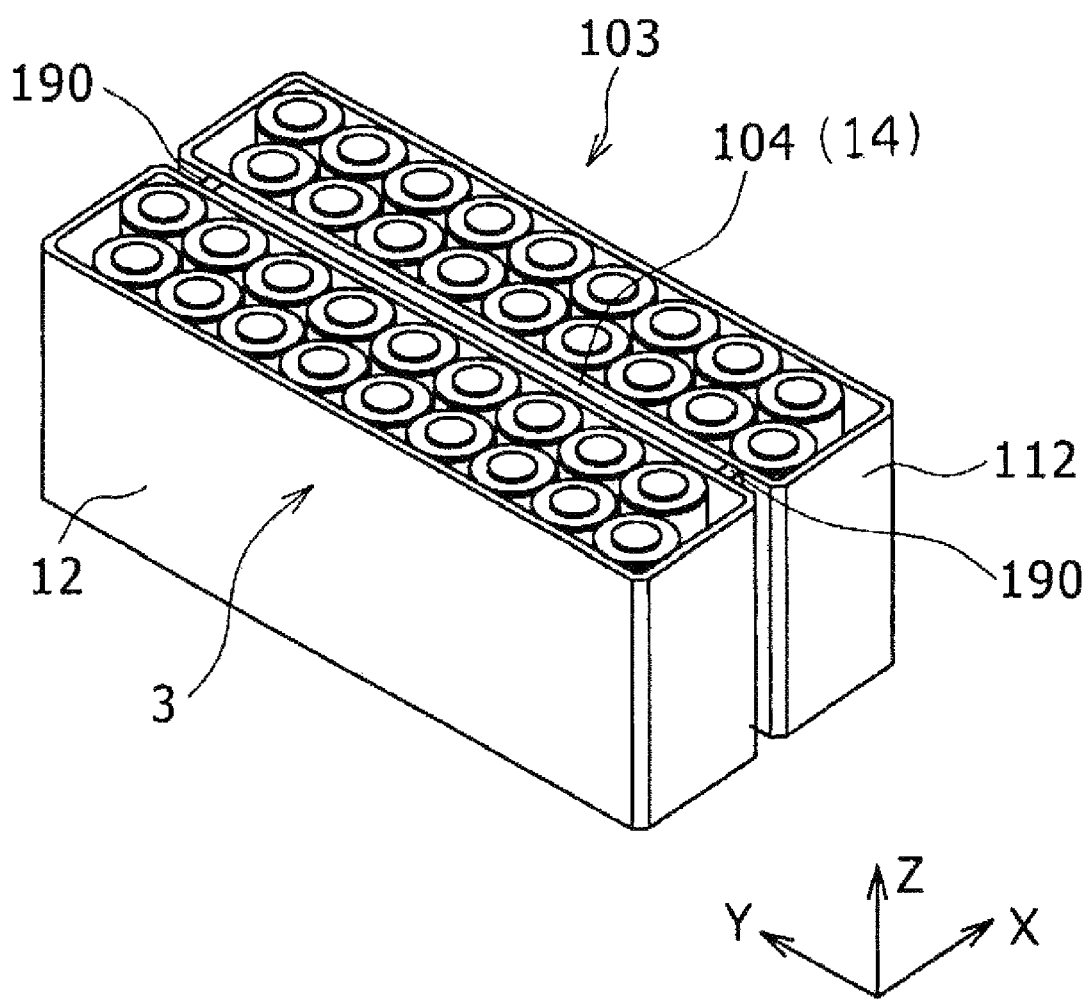
FIG. 7 is a perspective view illustrating a battery block disposed at one end in an X direction, another battery block being adjacent to a second side of the battery block in the X direction and including a ribbed block case, and a thermal insulating board disposed between the battery blocks.

As illustrated in FIG. 7, i.e. a perspective view of battery block 3 disposed at one end in the X direction, battery block 103 adjacent to a second side of battery block 3 in the X direction, and thermal insulating board 104 disposed between battery blocks 3, 103, ribs 190 may be in contact with block case 12 adjacent to ribbed block case 112 in the X direction. Thermal insulating board 104 may be disposed between one rib 190 and other rib 190 in the Y direction and between battery blocks 3, 103 adjacent to each other in the X direction. Specifically, thermal insulating board 104 may be disposed in a rectangular space in planar view, in which the rectangular space is defined by a surface of ribbed block case 112 adjacent to block case 12, two ribs 190, and a surface of block case 12 adjacent to ribbed block case 112.

In this modified example, it is preferable that ribbed block case 112 is made of a thermosetting resin containing a filler. More preferably, ribbed block case 112 is made of a filler-containing thermosetting resin having a thermal conductivity lower than 0.50 W/(m° C.) for excellent thermal insulating property and having a normal heat resistant temperature of 90° C. or greater for high thermal resistance. In an example shown in FIG. 7, block case 12 without rib 190 is in contact with ribs 190 of ribbed block case 112. However, a surface of another ribbed block case 112 may be in contact with ribs 190 of ribbed block case 112, with proviso that the surface in contact with ribs 190 has no rib 190.

Figure 8:
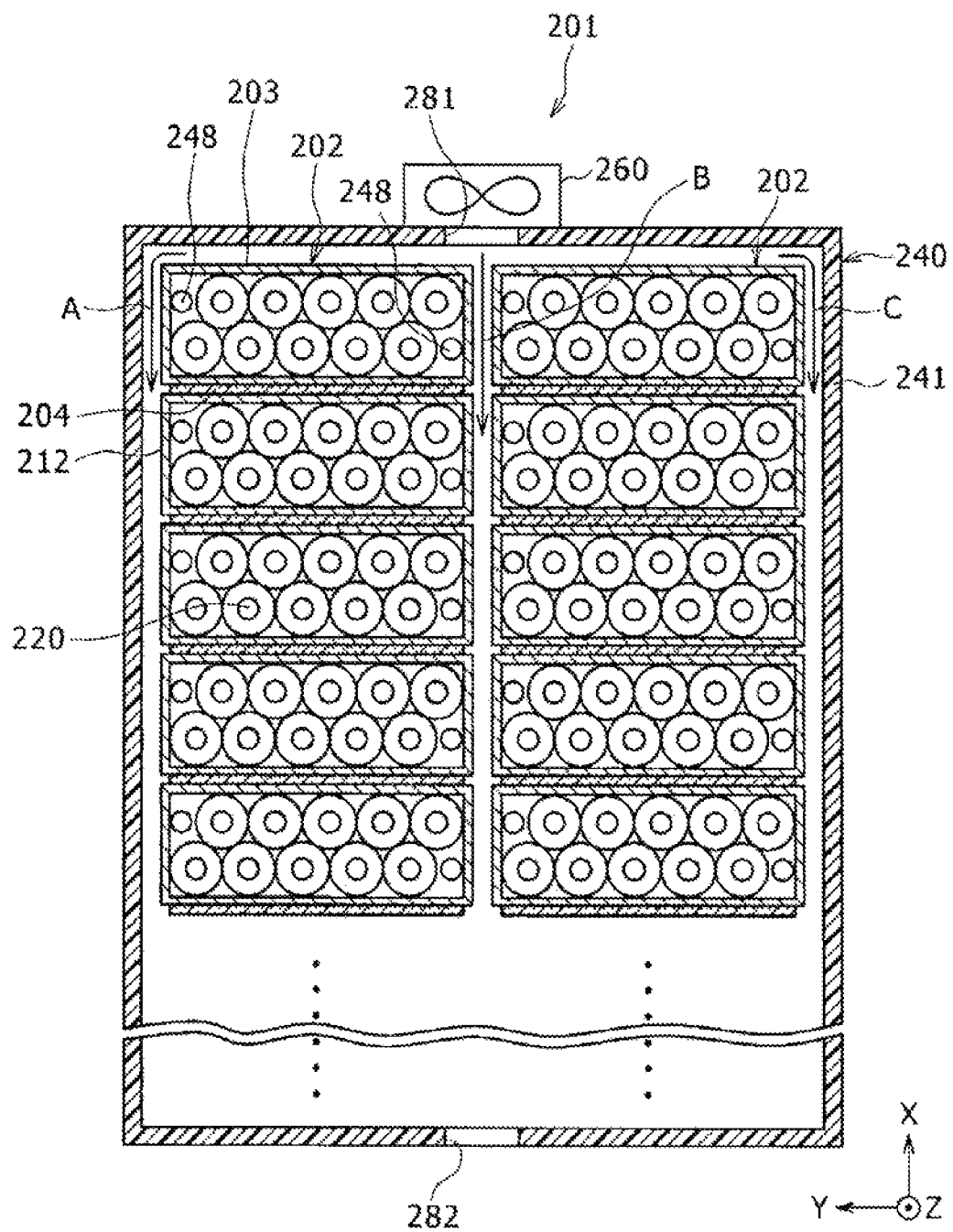
FIG. 8 is a schematic view illustrating a configuration of a battery module that is another modification of the battery module shown in FIG. 1.

In the exemplary embodiment and the modified example described above, battery module 1 has either of ribs 90, 190. With reference next to FIG. 8, battery module 201 may have no rib. FIG. 8 is a plan view of a modified example of battery module 201 viewed from the one side of the Z direction. In FIG. 8, for readily understanding of a configuration of battery module 201, illustration of first and second lid parts and positive- and negative-electrode current collector plates is omitted. In the drawing of battery module 201, cross sections of lateral wall 241 of housing 240, block cases 212 of battery blocks 203, and thermal insulating boards 204 are shown by hatching.

With reference to FIG. 8, battery module 201 of this modified example includes housing 240, a plurality of battery blocks 203 accommodated in housing 240, thermal insulating boards 204 acting as a thermal insulator, and fan 260. In common with the exemplary embodiment described above, housing 240 includes a positive-electrode current collector plate, a negative-electrode current collector plate, a first lid part, and a second lid part.

Battery module 201 has battery block units 202 in two columns that are arranged in the Y direction. Battery block units 202 each include the plurality of battery blocks 203 arranged at intervals in the X direction, which is regarded as one direction. A plurality of cylindrical batteries 220 is closely arranged in a staggered formation inside block case 212 forming a rectangular frame. Thus, gaps (spaces) are created near two corners in block case 212 that are diagonally opposite to each other. Two fasteners 248 (that are each made up of a bolt and a nut, for example) are disposed in the two respective gaps (the spaces) created in block case 212 in planar view. A front part and a back part of housing 240 are made from a metallic material. Fastener 248 includes a bolt that penetrates housing 240 from a front side to a back side of housing 240 along the Z direction and a nut that fixes the bolt to a bottom of housing 240. Fastener 248 partly overlaps block cases 212 in the X direction (the Y direction). Fasteners 248 put (position) battery block 203 in proper alignment with housing 240.

Thermal insulating board 204 is disposed between battery blocks 203 adjacent to each other in the X direction. Thermal insulating board 204 is clamped between block cases 212 of battery blocks 203 adjacent to each other in the X direction, and hence the thermal insulating board remains stationary with respect to block cases 212 by frictional force. Thermal insulating board 204 may be stuck onto an external surface of a lateral wall of battery block 203.

Lateral wall 241 of housing 240 has air inflow through-hole 281 at its first side in the X direction and air outflow through-hole 282 at its second side in the X direction. Battery module 201 has fan 260 at a location overlapping an opening of air inflow through-hole 281 in the X direction. Fan 260, for example, includes an axial fan and a centrifugal fan. In response to a fun drive, air is taken in through air inflow through-hole 281, flows in housing 240 along courses indicated with arrows A, B, C, and is subsequently discharged from air outflow through-hole 282. In this modified example, fan 260 is disposed near an outside of air inflow through-hole 281. The fan may be disposed near an inside of the air inflow through-hole. The fun may be disposed near an outside or an inside of the air outflow through-hole.

Battery module 201 of this modified example is configured to put battery blocks 203 in proper alignment with housing 240 by fasteners 248 using dead spaces created near two diagonally opposed corners in respective block cases 212. This configuration allows battery module 201 to be made compact. Lateral walls of battery blocks 203 are cooled by air flowing inside housing 240 owing to driven fan 260. This configuration not only substantially prevents a rise in temperature of cylindrical batteries 220 contained in battery blocks 203 different from battery block 203 that contains cylindrical battery 220 having abnormally generated heat, but also inhibits a rise in temperature of other cylindrical batteries 220 in battery block 203 that contains cylindrical battery 220 having abnormally generated heat.

Figure 9:
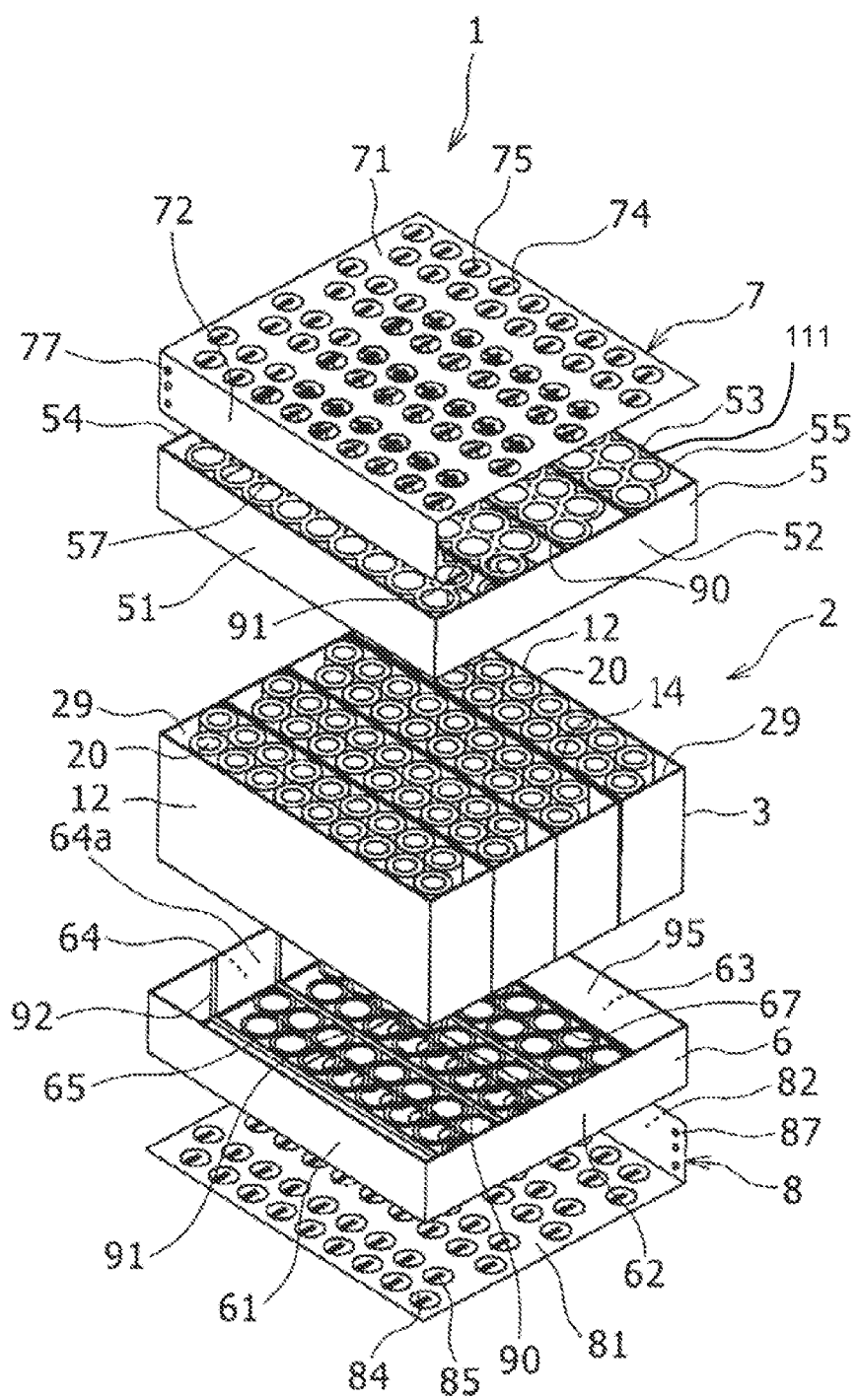
FIG. 9 is an exploded perspective view of a battery module according to another exemplary embodiment of the present disclosure.

FIG. 9 is an exploded perspective view of battery module 1 according to another exemplary embodiment of the present disclosure. In FIG. 9, components identical to those of battery module 1 of FIG. 1 according to the exemplary embodiment of the present disclosure are denoted by the same numerals or symbols.

Battery module 1 shown in FIG. 9 has no thermal insulating board 4. Instead, gap 14 exists.

Battery blocks 3 are inserted one by one between a first inner end face of first lid part 5 in the X direction and rib 90 adjacent to the first inner end face, between a second inner end face of first lid part 5 in the X direction and rib 90 adjacent to the second inner end face, and between adjacent ribs 90 on first lid part 5 in the X direction such that a first part of battery blocks 3 in the Z direction is covered with first lid part 5. Battery blocks 3 are inserted one by one between a first inner end face of second lid part 6 in the X direction and rib 90 adjacent to the first inner end face, between a second inner end face of second lid part 6 in the X direction and rib 90 adjacent to the second inner end face, and between adjacent ribs 90 on second lid part 6 in the X direction such that a second part of battery blocks 3 in the Z direction is covered with second lid part 6. Rib 90 put between battery blocks 3 that are adjacent to each other in the X direction prevents these battery blocks from being brought into contact with each other and keeps these battery blocks separated from each other in the X direction. Consequently, gap 14 into which air enters exists between battery blocks 3 adjacent to each other in the X direction. A lateral wall 51, 52, 53, or 54 including the first lid part 5 (and/or a lateral wall 61, 62, 63, or 64, including the second lid part 6) and covering a periphery of the battery block unit 2 has a through-hole through 111 which an inside and an outside of the lateral wall communicate.

Each gap 14 overlaps second and third rib parts 92 on first and second lid parts 5, 6 when viewed along the Y direction. Each gap 14 overlaps first rib parts 91 on first and second lid parts 5, 6 when viewed along the Z direction. Since gap 14 is created between battery blocks 3 adjacent to each other in the X direction, heat conduction is inhibited between adjacent battery blocks 3 in the X direction.

According to the exemplary embodiment described above, a plurality of cylindrical batteries 20 in battery block 3 is closely arranged in two or more rows in a staggered formation. Thus, every gap created between the plurality of cylindrical batteries 20 is small, and the density of the plurality of cylindrical batteries 20 disposed in each battery block 3 is high. This configuration enables battery module 1 to include cylindrical batteries 20 having high energy density. Temperature of cylindrical batteries 20 in each battery block 3 is uniformed by battery cases 21 and block case 12. Block case 12 made of a metal is more effective than block case 12 made of a resin in making temperature of cylindrical batteries 20 uniform.

The plurality of cylindrical batteries 20 included in battery module 1 are distributed among a plurality of battery blocks 3. Gap 14 exists between adjacent battery blocks 3. As a result, even if cylindrical battery 20 included in one battery block 3 generates heat due to an abnormality and reaches a high temperature, heat from abnormal cylindrical battery 20 is hard to pass through gap 14. This configuration hinders influence of the heat generation from extending to cylindrical batteries 20 in other battery blocks 3 and confines the influence to cylindrical batteries 20 within battery block 3 accommodating cylindrical battery 20 with which the abnormality has occurred. This averts an increase in temperature of the plurality of cylindrical batteries 20 inside battery block 3 adjacent to battery block 3 in which the abnormality has occurred and thereby inhibits an adverse impact that is otherwise created by an increase in the temperature.

If thermal runaway is produced by putting a nail into cylindrical battery 20 in any one battery block 3 by experiment or testing, heat transmitted to block case 12 of battery block 3 (an abnormal battery block) having cylindrical battery 20 that has entered thermal runaway decreases by gap 14 before reaching battery block 3 adjacent to the abnormal battery block. The heat is then absorbed and dispersed by block case 12 and battery cases 21 of adjacent battery block 3 and is transmitted to cylindrical batteries 20 in adjacent battery block 3. Thus, heat to be transmitted to adjacent battery block 3 can be decreased to a level lower than a temperature at which thermal runaway propagates to cylindrical batteries 20 to prevent thermal runaway present at cylindrical battery 20 in abnormal battery block 3 from propagating to cylindrical batteries 20 in adjacent battery block 3. In particular, due to heat radiation by block case 12 of adjacent battery block 3, block case 12 made of a metallic material is helpful in lowering heat to a temperature at which cylindrical batteries 20 in adjacent battery block 3 do not enter thermal runaway. Block case 12 made of a resin material that contains an endothermic filler having an endothermic property lowers heat generated in block case 12 and is thus helpful in lowering heat to a temperature at which cylindrical batteries 20 in adjacent battery block 3 do not enter thermal runaway. If block case 12 is formed of a resin material, the resin material is preferably a thermosetting resin. A thermosetting resin forming block case 12 prevents block case 12 of abnormal battery block 3 from being melted, resulting in no resin melting. This prevents block case 12 of abnormal battery block 3 and block case 12 of adjacent battery block 3 from being put into contact with and thermally coupled to each other. Moreover, a thermosetting resin forming block case 12 prevents the block case 12 of abnormal battery block 3 from being deformed. This prevents a gas emitted from abnormal cylindrical battery 20 from arriving at adjacent battery block 3 through a deformed place in the block case of the abnormal battery block so that adjacent battery block 3 is not exposed to high temperature. This in turn removes a factor responsible for impairing thermal insulation performance.

Preferably, gap 14 is defined so as to have thermal insulation performance and lower a maximum temperature of heat generated in abnormal battery block 3 to a level at which all cylindrical batteries 20 in adjacent battery block 3 do not enter thermal runaway. Block case 12 is supposed to reach the maximum temperature in response to thermal runaway that has occurred to all cylindrical batteries 20 accommodated in the block case of battery block 3.

If the block cases include ribbed block case 112 shown in FIG. 6, definite gap 14 is suitably created, as shown in FIG. 7, between battery block 3 disposed at one end in the X direction and battery block 103 adjacent to a second side of battery block 3 in the X direction, i.e. between adjacent block cases 112.

In other words, as shown in FIG. 7, which illustrates battery block 3 disposed at one end in the X direction and battery block 103 adjacent to the second side of battery block 3 in the X direction, ribs 190 are in contact with block case 12 adjacent to ribbed block case 112 in the X direction. As a consequence, gap 14 may be disposed between one rib 190 and other rib 190 in the Y direction and between battery blocks 3, 103 adjacent to each other in the X direction. Specifically, gap 14 is a substantially rectangular parallelepiped in shape and is defined by a surface of ribbed block case 112 adjacent to block case 12, two ribs 190, and a surface of block case 12 adjacent to ribbed block case 112.

Figure 10:
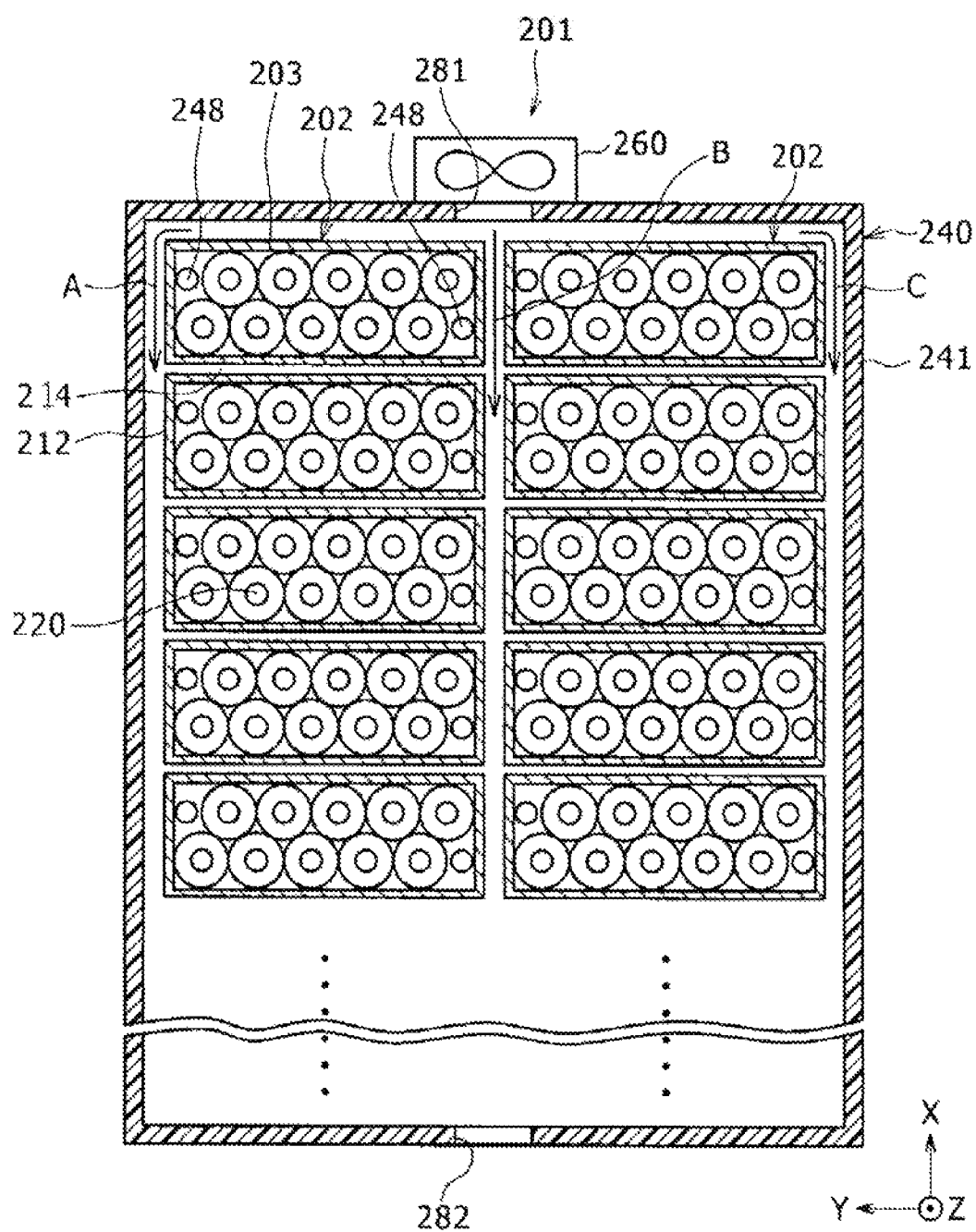
FIG. 10 is a schematic view illustrating a configuration of a battery module that is another modification of the battery module shown in FIG. 9.

FIG. 10 is a plan view of a modified example of battery module 201 viewed from the one side of the Z direction. In the battery module, a gap is formed between adjacent block cases that each have no ribs. In FIG. 10, for readily understanding of a configuration of battery module 201, illustration of first and second lid parts and positive- and negative-electrode current collector plates is omitted. In the drawing of battery module 201, cross sections of lateral wall 241 of housing 240 and block cases 212 of battery blocks 203 are shown by hatching.

With reference to FIG. 10, battery module 201 of this modified example includes housing 240, a plurality of battery blocks 203 accommodated in housing 240, and fan 260. In common with the exemplary embodiment described above, housing 240 includes a positive-electrode current collector plate, a negative-electrode current collector plate, a first lid part, and a second lid part.

Battery module 201 has battery block units 202 in two columns that are arranged in the Y direction. Battery block units 202 each include the plurality of battery blocks 203 arranged at intervals in the X direction, which is regarded as one direction. A plurality of cylindrical batteries 220 is closely arranged in a staggered formation inside block case 212 forming a rectangular frame. Thus, gaps (second gaps) are created near two corners in block case 212 that are diagonally opposite to each other. Two fasteners 248 (that are each made up of a bolt and a nut, for example) are disposed in the two respective gaps (the second gaps) created in block case 212 in planar view. A front part and a back part of housing 240 are made from a metallic material. Fastener 248 includes a bolt that penetrates housing 240 from a front side to a back side of housing 240 along the Z direction and a nut that fixes the bolt to a bottom of housing 240. Fastener 248 partly overlaps block cases 212 in the X direction (the Y direction). Fasteners 248 put battery block 203 in proper alignment with housing 240.

The plurality of battery blocks 203 included in battery block unit 202 is arranged in the X direction such that an interval is put between the battery blocks facing each other. In other words, gap 214 into which air enters exists between battery blocks 203 adjacent to each other in the X direction. Lateral wall 241 of housing 240 has air inflow through-hole 281 at its first side in the X direction and air outflow through-hole 282 at its second side in the X direction. Battery module 201 has fan 260 at a location overlapping an opening of air inflow through-hole 281 in the X direction. Fan 260, for example, includes an axial fan and a centrifugal fan. In response to a fun drive, air is taken in through air inflow through-hole 281, flows in housing 240 along courses indicated with arrows A, B, C, and is subsequently discharged from air outflow through-hole 282. In this modified example, fan 260 is disposed near an outside of air inflow through-hole 281. The fan may be disposed near an inside of the air inflow through-hole. The fun may be disposed at an outside or an inside of the air outflow through-hole.

Battery module 201 of this modified example is configured to put battery blocks 203 in proper alignment with housing 240 by fasteners 248 using dead spaces created near two diagonally opposed corners in respective block cases 212. This configuration allows battery module 201 to be made compact. Lateral walls of battery blocks 203 are cooled by air flowing inside housing 240 owing to driven fan 260. In this example, because of gap 214 created between adjacent battery blocks 203, four faces of the lateral wall of each battery block 203 are cooled by air. This configuration not only substantially prevents a rise in temperature of cylindrical batteries 220 contained in battery blocks 203 different from battery block 203 that contains cylindrical battery 220 having abnormally generated heat, but also inhibits a rise in temperature of other cylindrical batteries 220 in battery block 203 that contains cylindrical battery 220 having abnormally generated heat.

The invention claimed is:

1. A battery module comprising:
a plurality of battery blocks arranged in one direction; and
a thermal insulator disposed between the battery blocks adjacent to each other in the one direction, the thermal insulator having a thermal insulating property, wherein each of the battery blocks includes:
a plurality of cylindrical batteries arranged in two or more rows in a staggered formation and central axes of the cylindrical batteries are parallel to each other,
a block case entirely surrounding and contacting a periphery of a battery unit made up of the plurality of cylindrical batteries such that movement of the plurality of cylindrical batteries is limited,
the plurality of cylindrical batteries includes a first cylindrical battery and a second cylindrical battery adjacent to the first cylindrical battery, and
an inner surface of a lateral wall of the block case contacts an outer surface of the first battery at a first location on the outer surface and does not contact a second location on the outer surface of the first cylindrical battery, wherein, at the second location, the first cylindrical battery contacts the second cylindrical battery.

2. The battery module according to claim 1, wherein the block case is made of a thermosetting resin containing a filler.

3. The battery module according to claim 1, wherein the thermal insulator includes a fiber sheet made of fibers and silica aerogel implanted into cavities of the fiber sheet.

4. The battery module according to claim 1, wherein the thermal insulator has a normal heat resistant temperature greater than or equal to a temperature that the block case achieves when thermal runaway occurs in the cylindrical batteries in the block case of one of the battery blocks.

5. The battery module according to claim 1, wherein
a first lid part and a second lid part are provided to cover the plurality of battery blocks,
the first lid part and the second lid part are each made of a resin and have respective holes to expose electrode terminals of the cylindrical batteries, and
the electrode terminals of the plurality of cylindrical batteries accommodated in the battery blocks are electrically connected to current collector plates disposed at respective outsides of the first lid part and the second lid part.

6. The battery module according to claim 1, further comprising:
a housing to accommodate the plurality of battery blocks inside; and
a fan,
wherein the housing has an air inflow through-hole at a first side of the housing in the one direction and an air outflow through-hole at a second side of the housing in the one direction, and
the fan creates a current of air flowing into the housing through the air inflow through-hole and flowing out of the housing through the air outflow through-hole.

7. The battery module according to claim 6, wherein each of the battery blocks is positioned with the housing by a fastener that is disposed in a second gap created between the block case and the cylindrical batteries in planar view.

8. The battery module according to claim 1, further comprising a first lid part placed on an end of a first part of a battery block unit including the plurality of battery blocks in a direction of the central axes of the cylindrical batteries to align the plurality of battery blocks with each other in the direction of the central axes,
wherein at least one of the first lid part and the block case is provided with a rib that at least partly overlaps the thermal insulator when viewed along a direction orthogonal to at least one of the one direction and the direction of the central axes.

9. The battery module according to claim 8, wherein the rib is provided on the first lid part, and
the battery blocks adjacent to each other in the one direction are separated by the rib in the one direction.

10. The battery module according to claim 8, wherein
the block case is made of a resin material having a thermal insulating property,
a plurality of the block cases incorporated in the battery block unit includes a ribbed block case provided with the rib projecting from a first end of the ribbed block case in the one direction, and
the rib is in contact with the block case adjacent to the first end of the ribbed block case in the one direction.

* * * * *